(12) United States Patent
Charbit et al.

(10) Patent No.: US 8,953,467 B2
(45) Date of Patent: Feb. 10, 2015

(54) ADAPTIVE TRANSMISSION MODES FOR TRANSPARENT RELAY

(75) Inventors: Gilles Charbit, Hampshire (GB); Hai Ming Wang, Beijing (CN); Chun Yan Gao, Beijing (CN); Jing Han, Beijing (CN)

(73) Assignee: Nokia Corporation, Espoo (FI)

( * ) Notice: Subject to any disclaimer, the term of this patent is extended or adjusted under 35 U.S.C. 154(b) by 1009 days.

(21) Appl. No.: 13/062,847

(22) PCT Filed: Aug. 26, 2009

(86) PCT No.: PCT/FI2009/050674
§ 371 (c)(1),
(2), (4) Date: Oct. 13, 2011

(87) PCT Pub. No.: WO2010/026287
PCT Pub. Date: Mar. 11, 2010

(65) Prior Publication Data
US 2012/0093061 A1    Apr. 19, 2012

Related U.S. Application Data

(60) Provisional application No. 61/191,485, filed on Sep. 8, 2008.

(51) Int. Cl.
| | | |
|---|---|---|
| H04L 12/26 | (2006.01) | |
| H04B 7/14 | (2006.01) | |
| H04J 1/10 | (2006.01) | |
| H04J 3/08 | (2006.01) | |
| H04W 4/00 | (2009.01) | |
| H04L 1/00 | (2006.01) | |
| H04B 7/155 | (2006.01) | |
| H04W 88/04 | (2009.01) | |
| H04W 28/04 | (2009.01) | |
| H04L 1/16 | (2006.01) | |
| H04L 1/18 | (2006.01) | |

(52) U.S. Cl.
CPC .......... H04B 7/15557 (2013.01); H04L 1/0034 (2013.01); H04L 1/0026 (2013.01); *H04L 2001/0097* (2013.01); *H04W 88/04* (2013.01); *H04W 28/04* (2013.01); *H04L 1/1607* (2013.01); *H04L 1/1812* (2013.01)

USPC .......... 370/252; 370/315; 370/329; 370/431

(58) Field of Classification Search
None
See application file for complete search history.

(56) References Cited

U.S. PATENT DOCUMENTS

| 2007/0060050 A1 | 3/2007 | Lee et al. |
| 2007/0153734 A1 | 7/2007 | Lee et al. |

(Continued)

FOREIGN PATENT DOCUMENTS

| CN | 101345568 A | 1/2009 |
| EP | 1804442 A1 | 7/2007 |

(Continued)

OTHER PUBLICATIONS

Ko, "Potential Technologies for LTE-Advanced", Next Generation Mobile Communication Research Team, Jun. 11, 2008, pp. 1-19.

(Continued)

*Primary Examiner* — Ashley Shivers
(74) *Attorney, Agent, or Firm* — Nokia Corporation

(57) ABSTRACT

There is transmitted to a user equipment UE in a first subframe of a radio frame a downlink shared channel DSCH according to a first relay-transmission mode (e.g., mode A or A' in the examples); then switch to a second relay-transmission mode (e.g., mode C or C' in the examples) within the radio frame based on a channel quality of the DSCH. After switching, then transmit to the UE, in a subsequent subframe of the radio frame, the DSCH according to the second relay-transmission mode. In this embodiment the HARQ process is synchronous and non-adaptive for mode C: the eNB re-transmits packets to the UE in a predetermined fashion to be concurrent with transmission of those same packets from the relay node, as scheduled by the eNB. In this embodiment the eNB receives the UE's NACK for the data that is to be retransmitted via relay through the relay node.

16 Claims, 4 Drawing Sheets

(56) References Cited

U.S. PATENT DOCUMENTS

| | | | |
|---|---|---|---|
| 2007/0213065 A1 | 9/2007 | Kang et al. | |
| 2008/0045212 A1 | 2/2008 | Kim et al. | |
| 2009/0240999 A1* | 9/2009 | Lee et al. | 714/748 |
| 2011/0306291 A1* | 12/2011 | Ma et al. | 455/9 |

FOREIGN PATENT DOCUMENTS

| | | |
|---|---|---|
| EP | 1898562 A2 | 3/2008 |
| EP | 1947895 A1 | 7/2008 |
| WO | 2008/002702 A2 | 1/2008 |
| WO | 2010/070385 A1 | 6/2010 |

OTHER PUBLICATIONS

"3rd Generation Partnership Project; Technical Specification Group Radio Access Network; Physical layer aspects for evolved Universal Terrestrial Radio Access (UTRA) (Release 7)", 3GPP TR 25.814, v7.1.0, Sep. 2006, pp. 1-132.

"A Discussion on Some Technology Components for LTE-Advanced", TSG-RAN WG1 #53, R1-082024, Agenda Item: 6.2, Ericsson, May 5-9, 2008, 11 pages.

"Discussion About DRS Requirements", 3GPP TSG-RAN WG4 Meeting #47bis, R4-081560, Agenda Item: 6.1.2.4, Nokia, Jun. 16-20, 2008, 2 pages.

"Requirements for LTE Advanced", REV-080006, Panasonic, Apr. 7, 2008, 5 pages.

"Self Backhauling and Lower Layer Relaying", TSG-RAN WG1 #53 bis, R1-082470, Agenda Item: 12, Ericsson, Jun. 30-Jul. 4, 2008, 3 pages.

"Some Further Considerations for Downlink Transparent Relay for LTE-A", TSG-RAN1 #54, R1-083158, Agenda Item: 12, Nortel Networks, Aug. 18-22, 2008, 10 pages.

"Technical Proposals and Considerations for LTE Advanced", 3GPP TSG RAN WG1, Meeting #53, R1-081791, Panasonic, May 5-9, 2008, 16 pages.

"Transparent Relay for LTE-Advanced FDD", TSG-RAN1 #53bis, R1-082517, Agenda Item:12, Nortel Networks, Jun. 30-Jul. 4, 2008, 8 pages.

International Search Report received for corresponding Patent Cooperation Treaty Application No. PCT/FI2009/050674, dated Nov. 11, 2009, 10 pages.

* cited by examiner

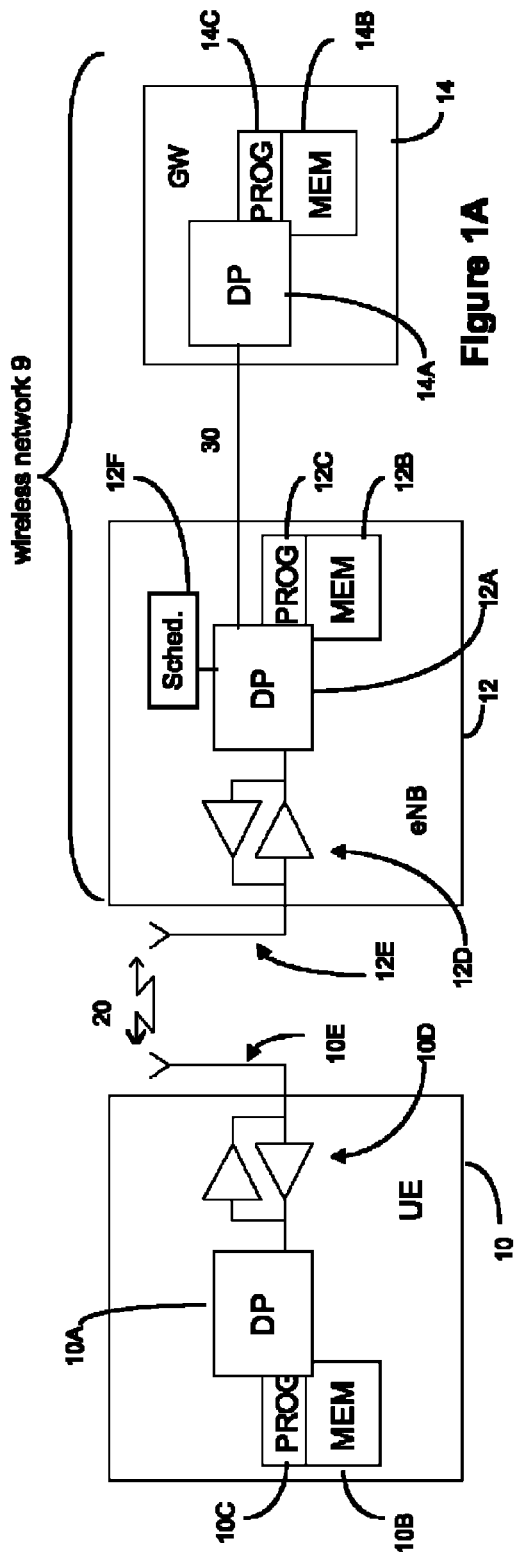
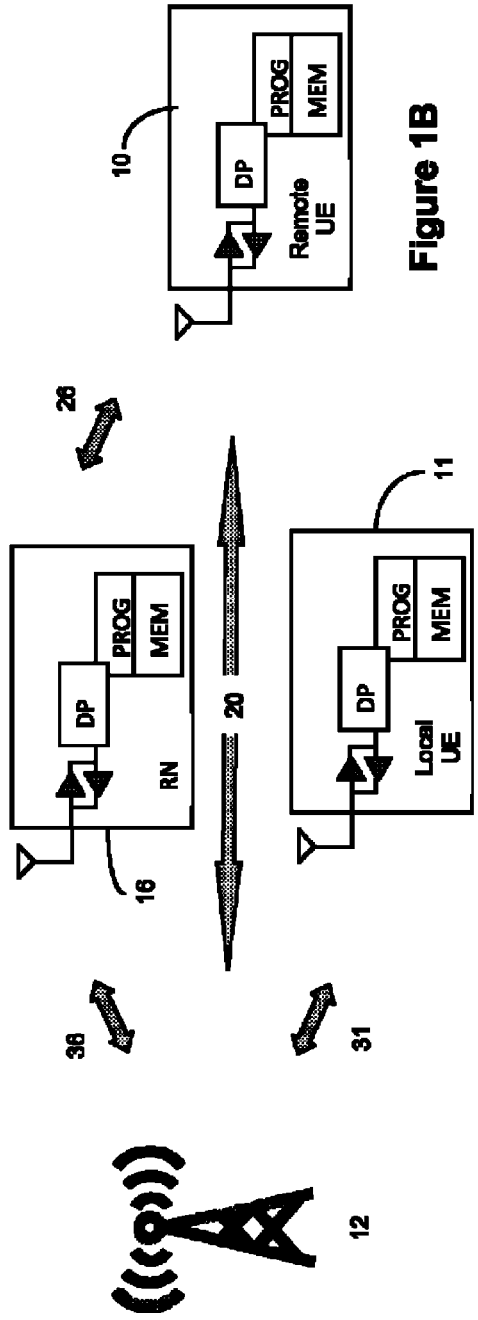
Figure 1A
Figure 1B

US 8,953,467 B2

ADAPTIVE TRANSMISSION MODES FOR TRANSPARENT RELAY

RELATED APPLICATION

This application was originally filed as PCT Application No. PCT/FI2009/050674 26 Aug. 2009 and claims priority to U.S. Provisional Application No. 61/191,485 filed on Sep. 8, 2008, which is incorporated herein by reference in its entirety.

TECHNICAL FIELD

The teachings herein relate generally to wireless networks that employ a relay between the access node and the user equipment, and are particularly relevant for the time division duplex mode of E-UTRAN (evolved UTRAN).

BACKGROUND

The following abbreviations and terms are herewith defined:
  3GPP third generation partnership project
  ACK acknowledgment
  CQI channel quality indicator(s)
  CRS/DRS common reference signal/dedicated reference signal
  DL downlink
  eNB Node B of an E-UTRAN system
  HARQ hybrid automatic repeat request
  LTE long term evolution of UTRAN (E-UTRAN or 3.9G)
  MCS modulation and coding scheme
  NACK negative acknowledgment
  Node B base station or similar network access node
  OFDM orthogonal frequency division multiplex
  P-BCH physical broadcast channel
  PDCCH physical downlink control channel
  PDSCH physical downlink shared channel
  PHICH physical HARQ indicator channel
  PRB physical resource block
  P-RACH physical radio access channel
  P/S-SCH primary/secondary synchronization channel
  PUCCH physical uplink control channel
  PUSCH physical uplink shared channel
  QoS quality of service
  RN relay node
  SFBC space frequency block coding
  UE user equipment (e.g., mobile equipment/station)
  UL uplink
  UMTS universal mobile telecommunications system
  UTRAN UMTS terrestrial radio access network 3GPP is standardizing the long-term evolution (LTE) of the UTRAN radio-access technology which aims to achieve reduced latency, higher user data rates, improved system capacity and coverage, and reduced cost for the operator. The current understanding of LTE relevant to these teachings may be seen at 3GPP TR 25.814 (v7.1.0, 2006-09) entitled PHYSICAL LAYER ASPECTS OF EVOLVED UTRA and herein incorporated by reference. Both frequency division duplex (FDD) and time division duplex (TDD) are considered in LTE.

One variation of LTE is termed LTE-Advanced or LTE-A. LTE-Advanced aims to provide significantly enhanced services by means of even higher data rates and lower latencies with reduced cost. Since the new spectrum bands for IMT (international mobile telecommunication, such as detailed at IMT-2000) contain higher frequency bands and LTE-Advanced is aiming at higher data rates, coverage of one eNB is limited due to the high propagation loss and limited energy per bit. Relaying has been proposed in many workshop presentations to enlarge the coverage, to improve the capacity and to improve the cell edge performance. Details of such proposals may be seen, for example, at document R1-082024 entitled "A discussion on some technology components for LTE-Advanced" by Ericsson (3GPP TSG RAN WG1 #53; Kansas City, Mo., USA; May 5-9, 2008); document REV-080006 entitled "Requirements for LTE advanced" by Panasonic (dated Apr. 7, 2008); and document R1-081791 entitled "Technical proposals and considerations for LTE advanced" also by Panasonic (3GPP TSG RAN WG1 #53; Kansas City, Mo., USA; May 5-9, 2008). These are attached to the priority document (U.S. Provisional Patent Application Ser. No. 60/191,485) as respective exhibits A, B and C.

Backward compatibility of LTE-Advanced with LTE is required. For this reason, the design of a transparent relay concept to LTE Release 8 (Rel.8) UEs is attractive, where the node performing relay of data/signaling between the eNB and the UE is essentially transparent to the UE. Though the higher layer relay (referred to at document R1-082024 as self backhauling) will have little impact on the published standard implementation of LTE-Advanced, the relay concept introduces large delay and overhead.

In certain terminal implementations consistent with Rel.8 of LTE for TDD, the channel estimator uses a CRS across subframe boundaries. The channel estimator is reset after each UL subframe. Introduction of relays in the network will need to be compatible with these pre-existing/pre-designed UEs. As relays are not yet specified, this means these Rel.8 UEs have no knowledge of relays in the network. To achieve backward-compatibility with these Rel.8 UEs, the already-designed channel estimation algorithm must be addressed as well as common and shared signaling.

The problem is illustrated by example. Consider the case where a current DL subframe is received by a UE from a RN, and a previous (contiguous) DL subframe is only received by the UE from the eNB. This forms two links: RN to UE and eNB to UE, over the current and previous sub-frames respectively. If that UE is one of the Rel.8 (or similar) ones, it has no way of knowing that it received the two different subframes over two different links. The channel estimator in the UE will interpolate the CRS over both of those sub-frames to estimate the channel for demodulation and decoding. As applied to the PDSCH in the current subframe, this will yield the wrong channel estimate and have a significant impact on PDSCH detection reliability. The problem also exists if, in the current subframe, both the RN and eNB transmit to the UE in a co-operative diversity mode.

Simply said, backward-compatibility with Rel.8 UEs means that relays must not interfere with UEs, since the UEs must be able to receive eNB common signaling for initial cell access (e.g. CRS, P/S-SCH, P-BCH), for neighbor cell monitoring, and also for shared control signaling (e.g. PDCCH, PHICH, PUCCH) so as to acquire parameters that are used for data transmission. This implies that a transparent relay needs to be used, for which one embodiment is set forth at document R1-082470 entitled "Self-backhauling and lower layer signaling" by Ericsson (3GPP TSG RAN SG1 #53 bis; Warsaw, Poland; Jun. 30-Jul. 4, 2008), attached to the above-referenced priority document as Exhibit D.

There are additional issues to consider in making transparent relays compatible with Rel.8 UEs. Asynchronous HARQ was agreed for LTE DL in Rel.8, where the eNB always needs to send PDCCH for retransmission. For the case where relays are used, another issue arises is how the coordination can be done by the eNB and the RN to do concurrent transmission. In the DL, the eNB will send PDCCH and PDSCH in one subframe for retransmission when a NACK was received. But prior to that retransmission, the RN has to know which physical resources (time and frequency) are used for retransmission of the packet by the eNB, so that the RN can use the same resources to transmit the same packet concurrently.

Another issue that arises concerns PUCCH coverage. Consider the case where an ACK/NACK response from the UE is erroneously decoded in the eNB and/or in the RN. In such case, the inconsistent interpretation of the UE's ACK/NACK will cause some degradation of QoS. For example, if the Rel.8 UE sends back a NACK, then the eNB may receive/decode an ACK and the RN may receive/decode a NACK. In such a case, the eNB will re-allocate this resource to other users and the RN will do non-adaptive retransmissions. This can easily result in a serious resource collision, and in the presence of that collision the QoS of two users cannot be guaranteed.

DRS for relays was recently proposed by Nortel at document R1-083158 entitled "Some further considerations for Downlink Transparent Relay for LTE-A" (3GPP TSG RAN1 #54; Jeju, Korea; Aug. 18-22, 2008), attached to the above-referenced priority document as Exhibit E.

SUMMARY

In a first aspect thereof the exemplary embodiments of this invention provide a method which comprises: transmitting to a user equipment in a first subframe of a radio frame at least one downlink shared channel according to a first relay-transmission mode; switching to a second relay-transmission mode within the radio frame based on a channel quality of the downlink shared channel; after switching, transmitting to the user equipment in a subsequent subframe of the radio frame on the at least one downlink shared channel according to the second relay-transmission mode; and for the case of a packet re-transmission according to the second relay-transmission mode, re-transmitting the packet to the user equipment in a pre-determined manner so as to be concurrent with transmission of a same packet from a relay node.

In a second aspect thereof the exemplary embodiments of this invention provide a computer readable memory storing a program of instructions. In this aspect of the invention, when the stored instructions are executed by a processor they result in actions which comprise: transmitting to a user equipment in a first subframe of a radio frame at least one downlink shared channel according to a first relay-transmission mode; switching to a second relay-transmission mode within the radio frame based on a channel quality of the downlink shared channel; after switching, transmitting to the user equipment in a subsequent subframe of the radio frame on the at least one downlink shared channel according to the second relay-transmission mode; and for the case of a packet re-transmission according to the second relay-transmission mode, re-transmitting the packet to the user equipment in a pre-determined manner so as to be concurrent with transmission of a same packet from a relay node.

In a third aspect thereof the exemplary embodiments of this invention provide an apparatus comprising sending means (for example a transmitter or a transceiver) and processing means (for example a digital signal processor or a general purpose processor). The sending means is for sending to a user equipment in a first subframe of a radio frame at least one downlink shared channel according to a first relay-transmission mode. The processing means is for switching to a second relay-transmission mode within the radio frame based on a channel quality of the downlink shared channel. Then, after switching, the sending means is for transmitting to the user equipment in a subsequent subframe of the radio frame on the at least one downlink shared channel according to the second relay-transmission mode. For the case of a packet re-transmission according to the second relay-transmission mode, the sending means is further for re-transmitting the packet to the user equipment in a pre-determined manner so as to be concurrent with transmission of a same packet from a relay node.

These and other aspects of the invention are set forth with more particularity below.

BRIEF DESCRIPTION OF THE DRAWINGS

The foregoing and other aspects of these teachings are made more evident in the following Detailed Description, when read in conjunction with the attached Drawing Figures.

FIG. 1A shows a simplified block diagram of various electronic devices/apparatus that are suitable for use in practicing the exemplary embodiments of this invention, and FIG. 1B shows an environment for embodiments of the invention where similar such devices/apparatus are in the positions of eNB, relay node, local/near UE and remote/far UE.

DETAILED DESCRIPTION

Figure 2:
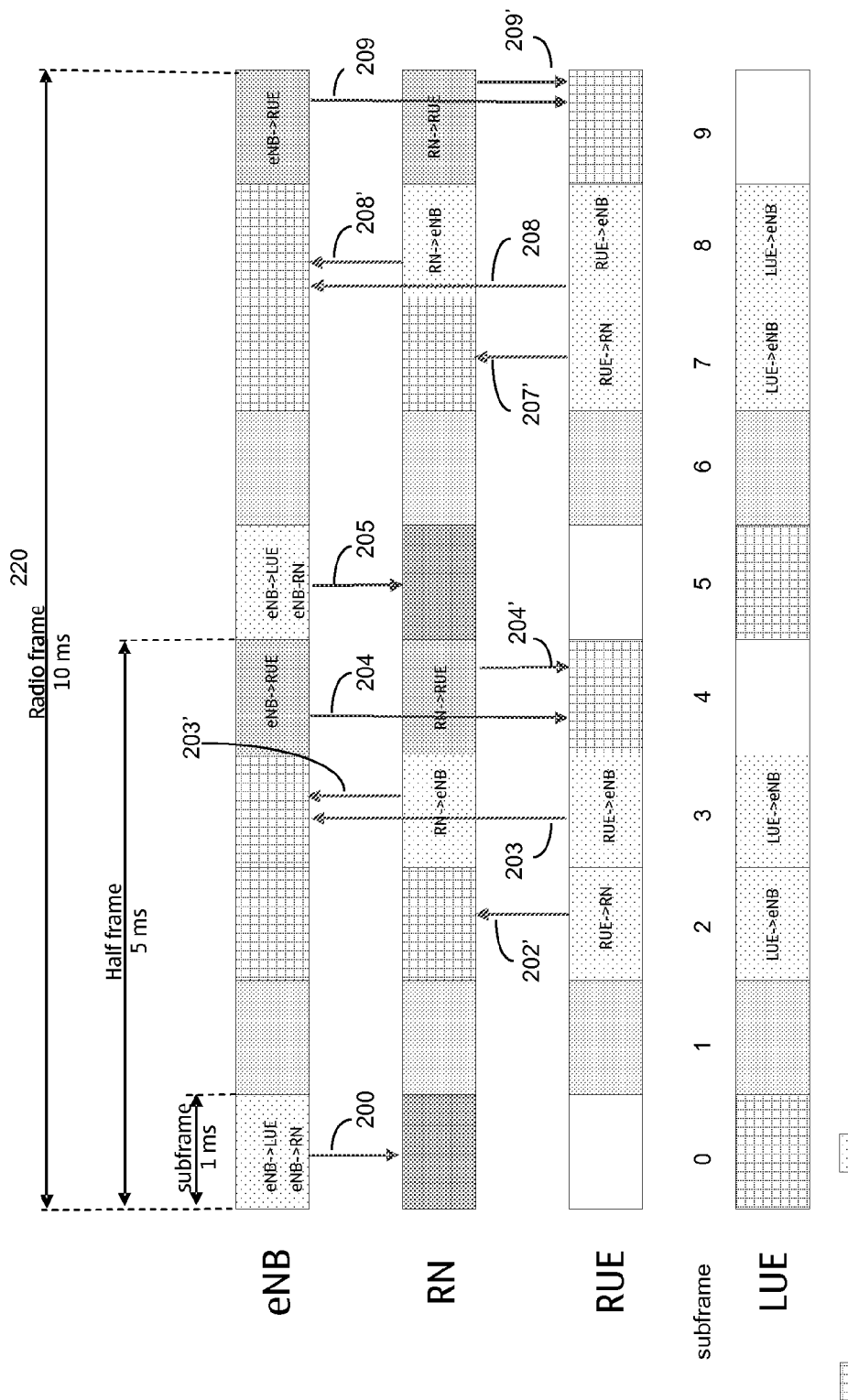
FIG. 2 illustrates an exemplary frame structure for LTE TDD UL/DL configuration 1 with a 5 ms DL-UL switching point periodicity in which the eNB transmits DRS to the UE and the relay transmits the same DRS to the same UE according to relay-transmission mode C detailed herein, and also showing HARQ signaling, all according to these teachings.

It is initially noted that the non-limiting examples and the explanations below are in the context of a LTE or LTE-Advanced network, but embodiments of this invention are not so limited and may be employed in any network protocol, such as for example UTRAN (universal mobile telecommunications system terrestrial radio access network), GSM (global system for mobile communications), WCDMA (wideband code division multiple access, also known as 3G or UTRAN), WLAN (wireless local area network), WiMAX (worldwide interoperability for microwave access) and the like, in which transmissions between the access node (eNB) and the UE (subscriber station) may pass through a relay node. Further, the various names used in the description below (e.g., DRS/CRS, PDSCH, ACK/NACK, eNB etc.) are not intended to be limiting in any respect but rather serve as particularized examples directed to specific LTE implementations using current LTE terms for a clearer understanding of the invention. These terms/names may be later changed in LTE and they may be referred to by other terms/names in different network protocols, and these teachings are readily adapted and extended to such other protocols.

Embodiments of this invention relate to different relay-transmission modes that are switched within a frame (e.g., at sub-frame boundaries within a single radio frame). The switching is done based on estimated channel quality, which may be measured/determined in different ways as detailed below. The different relay-transmission modes relate to initial transmissions, not re-transmissions such as may be sent in response to receiving a NACK from the UE. The transmissions may be of data on a shared channel PDSCH and/or control signaling on various common or shared control channels P-BCH, PDCCH and PHICH. It is noted that not every one of the modes must employ a relay, but since they are relay-transmission modes at least one of the modes that is a viable transmission option for the eNB must employ a relay, which in the examples is transparent to the UE. In an exemplary embodiment detailed below there are three relay-transmission modes, termed mode A, mode B and mode C.

In mode A the eNB transmits to the UE (on the P-BCH, PDCCH, PHICH, and PDSCH) a CRS but no DRS. In this mode A the relay (RN) is not used. Of course, the same eNB may simultaneously transmit to other UEs in a different mode in which a relay is used, but these non-limiting examples are in the context of a single UE. The UE uses the CRS to compute CQI for the PDSCH and for the control channels, and since the relay does not transmit in mode A there is no interference from it. In mode B the eNB transmits to the UE a CRS with the control channels P-BCH, PDCCH and PHICH and again does not transmit to the UE a DRS, but under mode B instance the eNB does not transmit to the UE the PDSCH; instead in this mode the relay transmits the PDSCH with a DRS to the UE. The UE can then use the DRS to compute its CQI for the PDSCH, and the CRS to compute its CQI for the control channels. In mode C the eNB transmits to the UE a CRS with the control channels P-BCH, PDCCH and PHICH, and also a DRS with the PDSCH. But further in mode C the relay also transmits to the UE, concurrently with the eNB's transmissions, the DRS and the PDSCH. The UE can use the DRS to compute its CQI on the PDSCH. Since this DRS is transmitted concurrently by both the eNB and the relay, the DRS is beamformed for cooperative diversity, and MIMO may also be used by the relay in mode C (since it is assumed the RN-to-UE link is the stronger of the two).

In general terms, the eNB transmits, to a UE in a first subframe of a frame, a CRS with no DRS on a DL shared channel (DL-SCH) using a first relay-transmission mode (e.g., mode A). Based on a channel quality of the DL-SCH the eNB switches to a second relay-transmission mode (e.g., mode C), and transmits to the UE in a different subframe of the frame a DRS on the DL-SCH using the second relay-transmission mode. Further details below add HARQ aspects to the above embodiment.

Reference is now made to FIG. 1A for illustrating a simplified block diagram of various electronic devices that are suitable for use in practicing the exemplary embodiments of this invention. In FIG. 1A a wireless network 9 is adapted for communication between a UE 10 and an access node (eNB) 12. The network 9 may include a gateway GW/serving mobility entity MME/radio network controller RNC 14 or other radio controller function known by various terms in different wireless communication systems. The UE 10 includes a digital processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the eNB 12.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The eNB 12 also includes a DP 12A, a MEM 12B, that stores a PROG 12C, and a suitable RF transceiver 12D coupled to one or more antennas 12E. Typically the eNB 12 operates an array of antennas for beamforming, MIMO operations, and the like, as is well known in the art. Each of these antennas is identified below by an antenna port number (port 1, port 2, etc.). The eNB 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the eNB 12 over the Iub link 30.

Also within the eNB 12 is a scheduler 12F that schedules the various UEs under its control for the various UL and DL subframes on the PDSCH. Once scheduled, the eNB 12 sends messages on the PDCCH to the UEs with the scheduling grants (typically multiplexing grants for multiple UEs in one message). Generally, the eNB 12 of an LTE/LTE-A system is fairly autonomous in its scheduling and need not coordinate with the GW/MME 14 excepting during handover of one of its UEs to another eNB.

At FIG. 1B are shown four nodes operating in a LTE-A system: the eNB 12, the remote UE 10, a local UE 11 which is near enough to the eNB 12 or has sufficient signal strength/channel reliability that relayed communications are not necessary to maintain a guaranteed quality of service, and a relay node 16. Each of the LUE 11 and the RUE 10 is similar to the UE 10 apparatus detailed above with respect to FIG. 1A; and each of the relay node 16 and the eNB 12 is similar to the eNB 12 apparatus detailed above with respect to FIG. 1A. The relay node 16 may be embodied as a UE or as a fixed relay that is network-owned or at least network-operated (e.g., mounted to a building, tower or train), so in some instances the relay may be MIMO capable and in other instances it may not. Major components of the nodes at FIG. 1B are shown being similar to those detailed with respect to FIG. 1A and are not detailed again. Also at FIG. 1B are links between the various nodes, each of which is shown as bi-directional: link 31 is between the eNB 12 and the local UE 11; link 36 is between the eNB 12 and the relay node 16; link 20 is as described at FIG. 1A between the eNB 12 and the (remote) UE 10, and link 26 is between the relay node 16 and the (remote) UE 10. There may be a link (not shown) between the relay 16 and the local UE 11, though if that were to be achieved by the relay-transmission mode switching detailed herein the LUE 11 would be considered a RUE 10 instead; the relay node 16 is used for transmissions to the RUE 10 but is not used for transmissions to the LUE 11, and the difference is based on the channel conditions which determine the relay-transmission mode in use.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and subframes/slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the eNB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, portable subscriber stations, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

In an exemplary but non-limiting embodiment of the invention, beamforming and relay transmission mode can be combined readily. It assumed that the DRSs are transmitted by the eNB 12 on antenna port 5 to the remote UE (RUE) 10 in the eNB-RUE link 20, and by the relay node 16 to RUE 10 in the RN-UE link 26. The eNB 12 and the relay node 16 can transmit a beamformed DRS and PDSCH to the RUE 10 concurrently under Mode C. A MIMO mode may be used for the eNB-local UE 11 (LUE) link 31, and/or for the eNB-RN link 36 to increase data rates. It is a reasonable assumption that these links 31, 36 benefit from a relatively high SINR (signal to interference plus noise ratio), as the LUE 11 does not require relay-aided transmission, and the eNB-RN fixed links 36 can be planned in the network (for the case where the relays in use are network-owned and/or operated).

Exemplary but non-limiting embodiments of the invention also assume that the relay-aided transmissions (link 26) can operate at a significantly higher SINR. The eNB 12 may indicate to the relay node 16 the MCS scheme to be used for the concurrent eNB 12 and relay node 16 transmissions to the RUE 10. The choice of MCS may be based on an outer loop link adaptation (OLLA) mechanism depending on ACK/NACK rates when relay-aided transmission is switched on via switching the relay-transmission mode. The eNB 12 may monitor channel quality indications/indicators CQI, which are computed by the UE from the CRS, and from monitoring ACK/NACK reports sent by the UE in order to determine the proper relay-transmission mode that switches on or off the relay mode.

As noted above, in an exemplary and non-limiting embodiment of the invention there are three relay-transmission modes from which the eNB 12 chooses. These modes may be published in a standard for making relay transmissions compatible with Rel.8 UEs and stored in the eNB 12 memory 12B, and are reviewed again here and below in a bit further detail as to how they are selected.

Mode A: the eNB 12 transmits to the UE 10, 11 a common RS for P-BCH, PDCCH, PHICH and PDSCH. The common RS can be used for CQI computation in the LUE 11 and the RUE 10. The eNB does not send any DRS in mode A, and the relay node 16 is not used for transmission to the UEs operating under this mode.

Mode B: the eNB 12 transmits to the UE 10, 11 a common RS for P-BCH, PDCCH and PHICH. The common RS can be used for CQI computation in the LUE 11 and the RUE 10. The eNB 12 does not transmit any DRS, and does not transmit the PDSCH. Instead the relay node 16 transmits the DRS and the PDSCH.

Mode C: this mode may be considered a variant of mode B, where the eNB 12 transmits to the UE 10, 11 a common RS for P-BCH, PDCCH and PHICH. The common RS can be used for CQI computation in the LUE 11 and the RUE 10. There is concurrent transmission of the DRS and the PDSCH by the eNB 12 and the relay node 16 to the UE 10.

Relay-transmission modes A, B, and C may be switched according to the following exemplary but non-limiting procedure. Begin by assuming the eNB 12 transmits to the LUE 11 in mode A on link 31, which by the above description the LUE 11 computes CQI using the CRS. The LUE 11 reports this computed CQI to the eNB 12 as is normal. Now, if CQI measured from the CRS and reported by the UE is below some threshold value (CQI_threshold) and remains below that threshold for some predetermined period of time (t1), then the eNB 12 assumes that the UE 11 is in a bad channel condition and relay-aided transmission is triggered (which means the UE is now considered by the eNB 12 to be a RUE 10). The eNB 12 transmits on link 36 those packets it has for the RUE 10 (which in this example was originally the LUE 11) to the relay node 16 in mode B or C, and then the relay node 16 transmits those received packets to the RUE 10. For the case where relay-transmission mode C is used, co-operative diversity is enabled in that the eNB 12 transmits via link 20 the packets to the RUE 10 and the relay node 16 concurrently transmits via link 26 the same packets to the RUE 10. In either mode, the RUE 10 measures CQI on the link 26, 20 using the CRS or alternatively the DRS and reports that CQI back to the eNB 12. If in fact it occurs that the CQI measured from the CRS or alternatively DRS and reported by the UE 10 is higher than the CQI_threshold, the relay-transmission mode reverts back to mode A.

The CQI_threshold and the time threshold t1 are used at the eNB 12 to maximize coverage and throughput of the relay-aided transmission in modes B or C to the RUE 10. An exact determination of these thresholds is not detailed herein but may be readily determined, or even made relatively arbitrary so to approximate where a maximized data rate might be achieved without precision determination. In certain exemplary and non-limiting embodiments the relay-transmission mode A, B or C may be selected using ACK/NACK reporting which the eNB 12 receives from the UE 10 on the PUCCH, either instead of the UE's reported CQI or in conjunction with that CQI.

Consider FIG. 2 which illustrates transmissions and relay-transmission modes for both LUE 11 and RUE 10 within the same radio frame 220. DRSs are transmitted 204, 209 by the eNB 12 (on antenna port 5) to the RUE 10 over the eNB-RUE link 20 and also transmitted 204', 209' by the relay node 16 to the RUE 10 on the relay-UE link 26 in subframes 4 and 9 of the frame 220. Because the transmissions from the eNB 12 and from the relay node 16 to the RUE 10 are done concurrently, a co-operative diversity transmission mode is effectively carried out. The CRSs (e.g., sent on antenna ports 0, 1, 2, 3) are only transmitted by the eNB 12.

In the LUE 11, channel estimation in subframes 0 and 5 for the eNB-LUE link 31 only use the common RS which is sent 200, 205 by the eNB 12 in those subframes, since for the LUE 11 there are no transmissions from the relay node 16. Hence, there is no impact from the eNB-RUE transmission 204 or from the relay node-RUE transmission 204' in subframe 4 to the eNB-LUE 11 transmission 205 in subframe 5 (and similarly no impact from the transmission in subframe 9 of the previous radio frame from the eNB 12 (similar to transmission 209) and from the relay node 16 to the RUE 10 (similar to transmission 209') on the illustrated reception in subframe 0 by the LUE 11 of the transmission 201 from the eNB 12), because the relay does not transmit any common RS. While transmissions 200 and 205 are shown from the eNB 12 to the RN 16, the text within subframes 0 and 5 for the eNB indicate these transmissions are also to the LUE 11.

According to exemplary but non-limiting embodiments of the invention, the common signaling (CRS, P-SCH, S-SCH, P-BCH on DL and P-RACH on UL) and shared signaling (PDCCH, PHICH, etc. on DL and PUCCH on UL) are transmitted (DL) or received (UL) by the eNB 12, and the relay node 16 takes no part. This ensures a transparent relay operation. The relays are hence not used to enhance signaling coverage, as that function is provided solely by the eNB 12 in this exemplary but non-limiting embodiment. The relays 16 may be used to enhance PDSCH and PUSCH coverage and capacity.

In the RUE 10, the channel estimator (which lies in the transceiver 10D or alternatively within the processor/DSP 10A) is reset when processing the DRS to estimate the channel. This helps in case there is a DL subframe with an eNB-LUE link 20 immediately prior to a DL subframe with an eNB-RUE link 20 or a relay node-RUE link 26 (this scenario is not explicitly shown in the example of FIG. 2).

In certain current Rel.8 terminal implementations, this channel estimator in the UE is reset at the beginning of each subframe. The UE's channel estimator uses DRS in one physical resource block for channel estimation of PDSCH. Testing of the channel estimator implicitly requires that the channel estimator be reset.

The CRS (sent on antenna ports 0&1) are only transmitted by the eNB 12 for two-transmission antenna SFBC, P-BCH, PDCCH, and PHICH transmissions. CRSs on antenna ports 0, 1, 2, 3 are only transmitted by the eNB 12 for PDSCH transmissions over the eNB-LUE link 31. DRSs sent from antenna port 5 are transmitted by the eNB 12 and by the relay node 16 for the respective eNB-RUE link 20 and the relay node-RUE link 26.

Further at FIG. 2 it can be seen that at subframe 3 the RUE 10 transmits 203 to the eNB 12 and at subframe 7 the RUE 10 transmits 207' to the relay node 16. Similar holds true for the LUE 11 which can be seen in text at subframes 3 and 7 that it transmits to the eNB 12 in both of those subframes. The RUE 10 transmission 207' to the relay node 16 at subframe 7 is done without the RUE's knowledge of the relay node 16, as the RUE 10 assumes it's transmitting to the eNB 12. The can be done simply by the eNB 12 allocating PRBs for the RUE-relay node link 26 and indicating to the relay node 16 in which subframe it is scheduled to receive PUSCH packets on these PRBs from the RUE 10. Likewise, the eNB 12 also indicates to the RUE 10 these subframe and PRBs to use for transmission on the PUSCH packets, but there is no need for the eNB 12 to inform the RUE 10 that it will effectively transmit to the relay node 16. This mechanism allows backward-compatibility of Rel.8 terminals on the UL.

Companion to the above description of the relay-transmission modes are two alternative relay-aided HARQ procedures, detailed by way of example below. In one procedure, synchronous non-adaptive HARQ is used for concurrent transmission (e.g., in mode C), where in the relay-aided transmission the eNB 12 re-sends its packets in a pre-determined fashion with the relay node 16. In this relay-aided HARQ approach, the eNB 12 and the relay node 16 get an ACK/NACK response that the UE 10 sends on the PUCCH. The relay node 16 forwards the ACK/NACK from the UE 10 to the eNB 12. Using the specific example at FIG. 2, the eNB 12 and the relay node 16 receive the ACK/NACK response 202' and 207' in respective subframes 2 and 7 that is sent on the PUCCH by the UE 10. The relay node 16 forwards 203' and 208' in respective subframes 3 and 8 the ACK/NACK that it received 202' and 207' from the UE 10 in respective subframes 2 and 7 to the eNB 12. As the RN-RUE link 26 is more reliable than the eNB-RUE link 20, the eNB 12 will always trust the ACK/NACK forwarded by the relay node 16, as it is assumed to be more reliable. So if the eNB 12 receives the ACK/NACK from the UE 10 directly (in subframes 2 and 7 of the FIG. 2 example) as well as the relayed ACK/NACK from the relay node 16 (in subframes 3 and 8 of the FIG. 2 example), the case where there is a reception or decoding error is avoided because the eNB 12 relies on the ACK/NACK that it received from the relay node 16. This method improves PUCCH coverage for relay-assisted transmission on the UL.

In the alternate relay-aided HARQ procedure, asynchronous adaptive HARQ is used for concurrent transmission (mode C), where the eNB 12 will coordinate with the relay node 16 and then send agreed resources to the UE 10 for transmission, before the eNB 12 and the relay node 16 do their concurrent transmissions to the UE 10. In this relay-aided HARQ method, two variations are presented. First: the eNB 12 receives the ACK/NACK response sent on the PUCCH by the UE 10 to determine if the eNB 12 needs to re-transmit its packets to the UE 10 (this takes into account relay-aided PDSCH reception at the UE 10). Then the relay node 16 does not interpret the PUCCH and thus does not forward the ACK/NACK from the UE 10 to the eNB 12. The eNB 12 indicates to the relay node 16 that the relay node 16 will re-transmit the packets to the UE 10, and indicate the resources to be used for that concurrent transmission. In this case, the relay node 16 will always follow the relay-configured control-signaling message (i.e. sent on the PDCCH) from the eNB 12 to the relay node 16. In the second variation: the relay node 16 receives and interprets the PUSCH, and forwards the ACK/NACK from the UE 10 to the eNB 12. Note that the PUSCH may carry the ACK/NACK from the UE in case UE needs to acknowledge packets sent on the PDSCH while transmitting packets on the PUSCH on the UL. Using the structure of FIG. 2 again as an example, the eNB 12 receives on the PUCCH in subframes 3 and 8 the ACK/NACK response 203, 208 from the UE 10, and from those received ACK/NACKs determines if it needs to re-transmit the packet. This takes into account relay-aided PDSCH reception at the UE 10. The eNB 12 indicates to the relay node 16 that it will re-transmit the packet to the UE 10 and indicates 200, 205, in respective subframes 0 and 5, the radio resources to be used for that concurrent transmission. As above, the eNB 12 will trust the ACK/NACK forwarded by the relay node 12. In terms of the ACK/NACK information from the relay node 16, the eNB 12 will indicate to the relay node 16 that it will re-transmit the packets to the UE 10 and the eNB 12 will indicate to the relay node 16 the resources to be used for the concurrent transmission. In this case, the resource allocation signaling from eNB 12 to the relay node 16 will always override the ACK/NACK in the relay node 16.

In a variation on the above HARQ procedures, the first-described HARQ procedure can be re-used as well if the relay node 16 interprets the PUCCH and forwards the ACK/NACK to the eNB 12.

The synchronous non-adaptive HARQ procedure outlined above for concurrent transmission requires standardization in the relay node 16 and in the eNB 12, but is transparent to the UE 10. Specifically for the example shown at FIG. 2, the eNB 12 needs to schedule the PUCCH for the RUE 10 in subframe 7 so the RUE 10 can indicate its ACK/NACK response 207' for the packets the eNB and RN sent on the PDSCH in subframe 4 (204 and 204'), and schedules the PUCCH for the RUE in subframe 2 so the RUE can indicate its ACK/NACK for packets sent in subframe 9 of the previous radio frame (similar to transmissions 209 and 209' in the illustrated radio frame 220). The relay node 16 decodes and forwards the PUCCH to the eNB 12 in this HARQ embodiment. So for example the ACK/NACK received 202' at the RN in subframe 2 is relayed 203' by the RN to the eNB in subframe 3, and the ACK/NACK received 207' at the RN in subframe 7 is relayed 208' by the RN to the eNB in subframe 8. In this manner the the relay node 16 and in the eNB 12, but is transparent to the UE 10 also. The eNB 12 needs to schedule the PUCCH for the RUE 10 in subframes 3 and 8 to indicate its ACK/NACK response 203, 208 for packets sent 204 to that UE on the PDSCH in subframe 4 and in subframe 9 of the previous radio frame. In one embodiment for this asynchronous adaptive HARQ approach, the relay node 16 does not decode the PUCCH and does not forward the ACK/NACK it didn't decode to the eNB 12. The eNB 12 may schedule the PUSCH in subframes 2 and 7 (first transmission), and/or subframes 3 and 8 (relay-aided re-transmission) for the RUE 10. In another embodiment for this asynchronous adaptive HARQ approach, the procedure can be the same as the non-adaptive HARQ case detailed above if the relay node 16 will interpret the PUCCH and forward the ACK/NACK it receives to the eNB 12.

The table below summarizes the above HARQ processes.

| UE status | eNB status | RN status | Problem if RN doesn't forward ACK/NACK | Action in eNB & RN |
|---|---|---|---|---|
| ACK | ACK | ACK | No | RN sends ACK to eNB. |
|  | NACK | ACK | RN won't do retransmission--> the weak signal from eNB can not secure retransmission. The retransmission performance cannot be guaranteed | E-NB will stop retransmission and start new transmission. |
|  | NACK | NACK | Extra retransmissions | RN sends NACK to eNB. |
|  | ACK | NACK | RN will do retransmission but eNB will re-allocate this resource to other user--> serious resource collision may take place --> the QoS of two users can not be guaranteed | RN and eNB will follow NACK and do concurrent transmission. |
| NACK | ACK | ACK | No retransmissions | RN sends ACK to eNB. |
|  | NACK | ACK | RN won't do retransmission. The weak signal from eNB can not secure further retransmission. | E-NB will stop retransmission and start new transmission. |
|  | NACK | NACK | No | RN sends NACK to eNB. |
|  | ACK | NACK | RN will do retransmission but eNB will re-allocate this resource to other user--> serious resource collision may take place--> the QoS of two users can not be guaranteed | RN and eNB will follow NACK and do concurrent transmission. | eNB 12 may schedule the PUSCH in subframes 2 and 7 (first transmission), and/or subframes 3 and 8 (relay-aided re-transmission) for the RUE 10. The table below summarizes the issues with PUCCH coverage in case a PUCCH decoding error results in an erroneous ACK/NACK detection. For example, assume the UE 10 sends an ACK response, but the eNB 12 detects a NACK response and the relay node 16 detects an ACK response. Absent the relay node 16 forwarding the correct ACK response to the eNB 12, the eNB 12 would schedule re-transmission of the packet without the help of the relay node, and the re-transmission may then also fail. On the other hand, if the relay node 16 forwards the ACK response to the eNB 12, and the eNB trusts the forwarded ACK response when there is a conflict with its own decoded ACK/NACK response for the same packet then there is no need for re-transmission, and the eNB 12 may schedule transmission of a new packet instead of wasting resources scheduling a re-transmission.

The asynchronous adaptive HARQ procedure outlined above for concurrent transmission requires standardization in In one particular embodiment of the invention, the relay node 16 may also be used in the first transmission (prior to any ACK/NACK from the UE 10). This implies that the relay node 16 knows which resource to use to send data to the UE 10 and has received the packet to forward to the RUE on the PDSCH from the eNB. The eNB 12 sends the PDCCH to the UE 10 and both the eNB 12 and the relay node 16 sends the PDSCH to the UE 12 concurrently. At the same time, the eNB 12 sends a relay-configured control-signaling message to the relay node 16 indicating the resources to be used for the next concurrent transmission of a packet.

Now are detailed examples of the relay-transmission modes without beamforming. In this example the relay-transmission modes are the same as modes A, B and C noted above, but mode C is used for cooperative diversity. In the UE 10, channel estimation is done on the DRS, so under mode C the UE estimates the combined channel for the eNB-UE link 20 and the relay-UE link 26 (like two main paths) and in mode B the UE 10 estimates only the channel for the relay node—UE link 26. In both cases the channel estimation is done using the DRS the UE 10 receives. In mode A, the CRSs are used to estimate the channel for the eNB-UE link 20. These channel estimates in the various modes are then used to demodulate and decode the PDSCH, which is transmitted to the RUE 10 by the eNB 12 and/or by the relay node 16. In all modes the relay is transparent to the RUE 10. The RUE 10 is only required to know that it has to use DRS or CRS to estimate the channel for PDSCH demodulation and decoding.

CQI computation is a bit different and presented herein are two options to compute CQI. In a first option, any UE 10, 11 may use the DRS for channel estimation over the whole band and compute CQI for its own relay node-UE link 26 accordingly. The DRS is not beamformed by UE-specific beam-forming weights, and hence can effectively be used by any and all of the UEs in the cell that receive it for wideband CQI computation. It is assumed for this first option that the same DRS sequence is used for all UEs by the network/cell. This relay CQI mode will need specification, as it is not specified in LTE Rel. 8.

In a second option, the UE 10, 11 may use the CRS transmitted by the eNB 12 to compute the wideband CQI. An OLLA mechanism may be used to compensate for the relay gain, as relay-aided transmission to the RUE 10 will typically experience significantly better SINR levels at the RUE 10. The OLLA mechanism simply adds or subtracts a CQI offset based on ACK/NACK rates. This second option is preferred by the inventors at the present time because it does not require standardization; the CQI mechanism specified in LTE Rel. 8 may be used. To switch to or from the relay-transmission modes (B or C) that employ the relay node 16, the eNB 12 may (monitor CQI reported by the UEs 10, 11 which they computed from the CRS they received from the eNB 12 (in modes B or C) to see if the eNB-RUE link 20 has sufficiently improved so as to allow a switch to mode A; and/or the eNB 12 can monitor ACK/NACK reports from the UEs in mode A to see if relay-aided modes B or C need to be switched on.

If a multiple antenna configuration is used in the eNB 12 and/or in the relay node 16, then in an embodiment a simple single-stream transmit-diversity transmission mode can be in use—e.g. a Cyclic Delay diversity technique in which there is a cyclic delay offset (within a cyclic prefix resolution) between each transmit antenna of the same node 12, 16. Note that the number of transmit antennas 12E in the eNB 12 and in the relay node 16 may be different.

Synchronization requirements are fairly tight because signals from the eNB 12 or from the relay node 16 must arrive at the UE 10, 11 at the right time (e.g., within a cyclic prefix CP resolution). This is a normal signaling consideration and its resolution is well known in the art.

Note that in relay-transmission modes B and C the relay node 16 transmits the PDSCH, which it receives from the eNB 12. In an embodiment the PDSCH is demodulated and decoded in the relay node 16 before being encoded and modulated with typically a higher data rate (e.g., MCS with higher-order modulation and weaker coding) prior to transmission to the RUE 10. This effectively defines a L2-type relay (decode and forward). Another embodiment for the relay node 16 is as a L1-type relay (amplify and forward), where the PDSCH is simply amplified and forwarded. Such an amplify and forward embodiment is more adapted to the relay node being embodied as a mobile station (though not limited in that regard). Though simpler, the amplify and forward type relay does not remove noise at the relay node and does not take advantage of the better conditions on the RN-RUE link 26 as compared to the eNB-Rue link 20. It is assumed that the relay-aided transmissions in modes B and C can operate at a significantly higher SINR. The eNB 12 may indicate to the relay node 16 the MCS scheme to be used for the concurrent eNB 12 and relay node 16 transmissions to the RUE 10 (mode C). The eNB 12 may base its choice of MCS on the OLLA mechanism, depending on ACK/NACK rates in relay-transmission modes B or C.

Now consider a variation to the above three relay-transmission modes, the differences from those detailed above as follows. The different modes for transmission may be selected in an embodiment based on channel and interference conditions.

Mode A': the eNB 12 sends the same data to the relay node 16 and to the UE 10.

Mode B': the eNB 12 and the relay node 16 each transmit the same data to the UE 10.

Mode C: the eNB 12 and the relay node 16 send the same data to the UE 10, and at the same time the eNB 12 send a next packet (or set of packets) to the relay node 16 which stores them for later transmission to the UE 10.

The above description as to control channels and shared channel and reference signals still applies, but the actual data that is sent on the PDSCH differs in the primed modes A', B', and C' immediately above as compared to those unprimed modes A, B and C originally described. One difference though is that in mode B' both the eNB 12 and the relay node 16 transmit the PSDSCH which carries the data, as opposed to only the relay node 16 in the originally described unprimed mode B.

According to this embodiment of the invention, detailed with respect to FIG. 3, the different relay-transmission modes are selected in an exemplary embodiment as follows. First, DL transmissions to the UE 10 are according to transmission modes A and B as shown at block 302, based on ACK/NACK from UE. For example, if an ACK is received from the UE 10, then the next transmission will be according to relay-transmission mode A'. If instead a NACK is received from the UE 10, then the next transmission to it will be according to relay-transmission mode B'. Note that in both modes A' and B' the eNB 12 sends the data to the relay node 16, but the relay node 16 only sends that data over the air interface under relay-transmission mode B'. The mode A' transfer of the data to the relay node 16 is not considered a waste of radio resources since DL HARQ mechanism implies re-transmission of the packet using in-band spectrum resources and relay-assisted re-transmission may result in fewer re-transmissions required overall. Consider this individual ACK/NACK decision criteria at block 302 as a short-term measure of channel quality.

In this embodiment there is also a long term measure of channel quality in that the number of NACKs are accumulated and added. If in a fixed time duration T as shown at block 304 more than M NACKs are received from the UE 10 (M being an integer greater than one), then the eNB 12 will assume the UE 10 is in a bad channel condition and the relay node 16 has become necessary. The 'yes' option from block 304 then leads to block 306 where relay-transmission modes B' and C' are used by the eNB 12 and the relay node 16 for transmissions to the UE 10. Like block 302, the changes within block 306 between relay-transmission modes B' and C' are based on the individual ACK/NACK of the last transmission sent to the UE 10. Specifically, if an ACK is received from the UE 10, then the next transmission will be according to relay-transmission mode B'. If instead a NACK is received from the UE 10, then the next transmission to it will be according to relay-transmission mode C'. But the shift between block 302 which alternates between relay-transmission modes A' and B', and block 304 which alternates between relay-transmission modes B' and C', is based on the longer term measure of channel quality that is checked at block 304 whether there have been at least M NACKs accumulated within the time duration T. In order to account for improved channel conditions, at block 308 there is a timer with threshold/elapsed time t1 which runs once block 306 is entered. After that elapsed time t1, the signaling returns to block 302 and the eNB 12 will try transmission modes A 'and B' again, shifting as before based on the short term measure of individual ACK/NACK from UE 10. If instead the channel is still degraded, then the NACKs will accumulate and block 304 will assure the process continues.

Note that in block 302, the relay node 16 is used only for re-transmissions since there mode B' is only used in response to a NACK. But in block 306 the relay node 16 is used directly for first transmissions (not re-transmissions of the same data that was NACK'd) and delay is avoided by allowing transmission mode C' where the e NB 12 sends the new data/next packet or set of packets to the relay node 16 in advance of the time it might be needed. This is so that in each transmission time slot/subframe, relay-aided transmissions can be performed.

Figure 3:
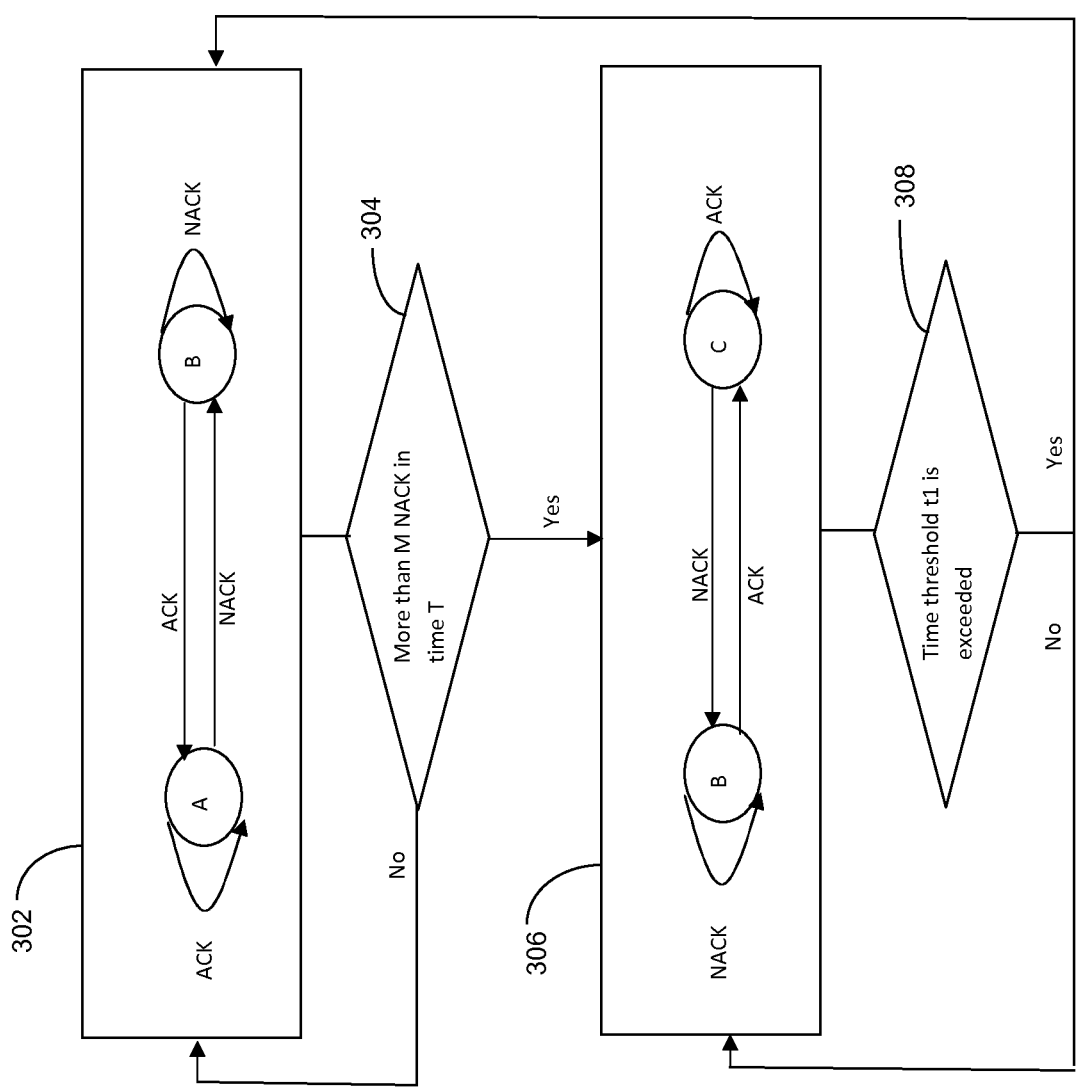
FIG. 3 is a flow diagram for switching among three different relay-transmission modes A', B' and C' according to one specific exemplary embodiment of the invention.

The embodiment shown by example at FIG. 3 may be used with beamforming, similar to that detailed earlier above except that in this embodiment beamforming is applied at the eNB 12 to the DRS and PDSCH in mode B' or C'. With reference also to the subframe examples shown at FIG. 2, the eNB 12 and the relay node 16 can transmit the beamformed DRS and PDSCH to the RUE 10 in sub-frames 4 and 9. The UE 10 can estimate a combined effective channel based on the DRS it receives. When there is a different antenna configuration at the eNB 12 as compared to the relay node 16, the beamforming matrix size will be different for the eNB 12 and the relay node 16, but seen from the UE 10 perspective it is simply a combined n-stream transmission. For example, consider the combined signal received at the UE as Y=(H1.P1+H2.P2).X+N, where X is the transmitted signal and N is Gaussian noise. H1 is the channel from the eNB 12 to the UE 10 (e.g., 2*4 matrix size from 4 transmit antennas) and P1 is a 4*1 matrix size, while H2 is the channel from the relay node 16 to the UE 10 (e.g., 2*2 matrix size from 2 transmit antennas) and P2 is a 2*1 matrix size. From the perspective of the UE 10, there is only a combined 2*1 channel: He=(H1.P1+H2.P2).

With the DRS, the UE 10 need not know the antenna configuration of the eNB 12 or the relay node 16, it need only to know the number of streams. In the example, there is only one stream, and it is beamformed.

Again with reference to FIG. 2, multiple input-multiple output MIMO mode may be used for the eNB-LUE link 31 or for the eNB-relay node link 36 in subframes 0 and 5 to increase data rates. It can be assumed that these links benefit from a relatively high SINR, as the LUE 11 does not require relay-aided transmission, and the eNB-relay node links 36 can be planned in the network where they are fixed (wired) links.

In summary, the various embodiments presented by example above enable transparent relays in a backward-compatible way with LTE TDD Rel.8 terminals. Synchronization and mobility procedures specified in Rel.8 may be used by the UE 10 with the proposed TDD relay frame structure and mapping of common and shared signaling. The exemplary mechanisms detailed above for switching on or off relay-aided transmission (e.g., switching among the relay-transmission modes) enables enhancements to PDSCH coverage and capacity.

Figure 4:
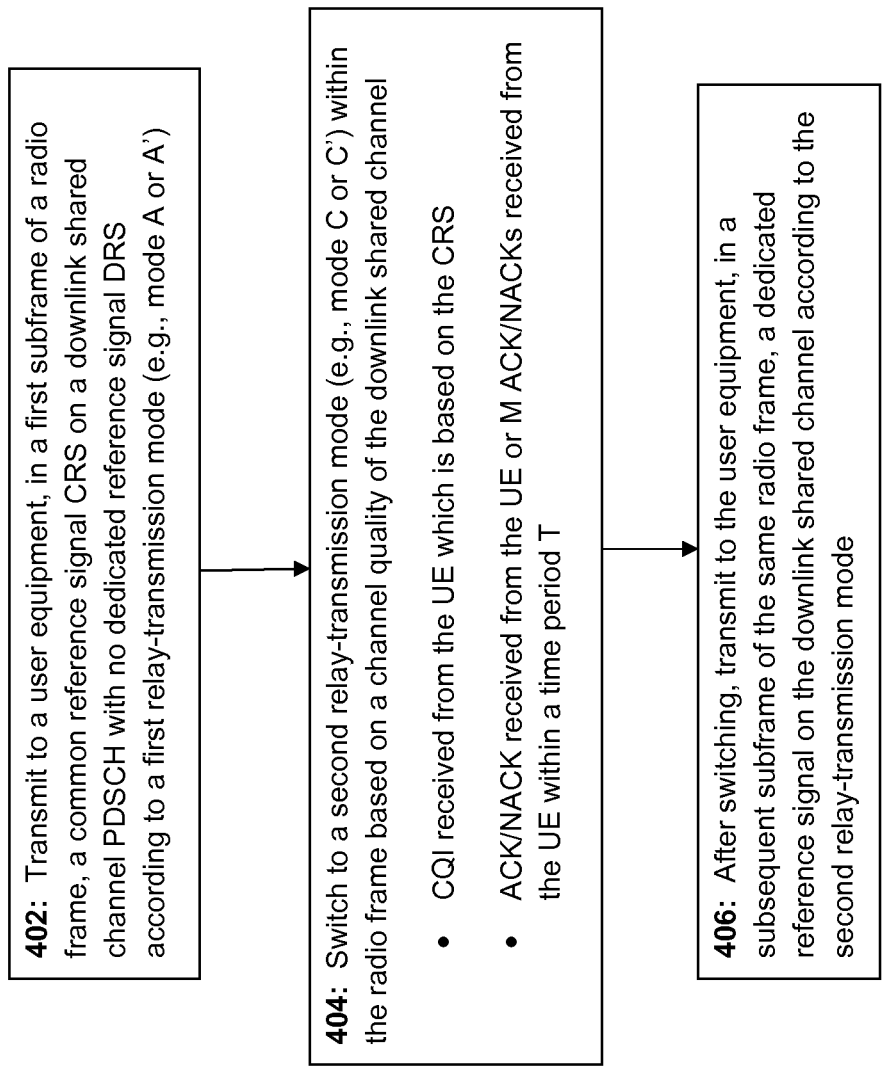
FIG. 4 is a flow diagram for switching among two different relay-transmission modes A and B according to a more generalized exemplary embodiment of the invention.

So according to an embodiment of the invention and as shown at FIG. 4 there is an apparatus (e.g., the eNB or a component thereof), a memory embodying a program of computer readable instructions directed to switching relay-transmission modes that when executed by a processor perform actions, and a method that includes at block 402 of FIG. 4 transmitting to a user equipment, in a first subframe of a radio frame, a common reference signal on a downlink shared channel with no dedicated reference signal according to a first relay-transmission mode (e.g., mode A or A'), at block 404 switching to a second relay-transmission mode (e.g., mode C or C') within the radio frame based on a channel quality (e.g., CQI received from the UE which is based on the CRS, ACK/NACK received from the UE or M ACK/NACKs received from the UE within a time period T) of the downlink shared channel, and after switching, at block 406 transmitting to the user equipment, in a subsequent subframe of the same radio frame, a dedicated reference signal on the downlink shared channel according to the second relay-transmission mode.

Individual ones or combinations of the below aspects may be employed with the above apparatus, memory and method according to further embodiments and variations as detailed above. In one aspect, for both modes A and B the eNB transmits control channels (P-BCH, PDCCH and PHICH) with a CRS and also transmits the shared channel (PDSCH) with a CRS in mode A but transmits the shared channel (PDSCH) with a DRS in mode C. In mode A the relay node does not transmit to the UE and in mode C the relay node transmits the DRS with the PDSCH to the UE.

In another aspect, there is a third mode B in which the eNB transmits the control channels with the CRS and does not transmit any DRS or the PDSCH; the relay node transmits the PDSCH with a DRS to the UE.

In another aspect is a method, memory storing a program and an apparatus that is configured to transmit to a user equipment, in a first subframe of a radio frame, a common reference signal on a downlink shared channel (with or without the DRS) according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, a dedicated reference signal on the downlink shared channel according to the second relay-transmission mode, but wherein in mode C the eNB and relay node can transmit beamformed DRS and PDSCH to the RUE 10 concurrently. In another aspect they are not beamformed but simply transmitted concurrently in mode C. In all cases of the relay node transmitting the PDSCH and DRS, the eNB schedules the relay node for that transmitting since in some cases it is concurrent and/or beamformed using UE-specific beamforming weights.

In another aspect the eNB transmits the DRS via antenna port 5, transmits the CRS on the control channels via antenna ports 0 and 1, and transmits the DRS via antenna ports 0, 1, 2 and 3.

In another aspect the eNB transmits in mode A in a MIMO mode and in mode C in a non-MIMO mode.

In another aspect is a method, a memory storing a program and an apparatus that is configured to transmit to a user equipment, in a first subframe of a radio frame, a downlink shared channel (with or without the DRS) according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, the downlink shared channel according to the second relay-transmission mode, but wherein in mode C the eNB indicates to the relay node which modulation and coding scheme the relay node is to use for its transmissions to the UE (which can also occur in mode B). The eNB may select the MCS based on outer loop link adaptation based on ACK/NACK rates. The CRS/DRS distinction may or may not be present in embodiments according to this aspect of the invention.

In another aspect the channel quality on which the switching between first and second (and third, mode B) relay-transmission modes is based comprises the UE's ACK/NACK reports sent on the PUCCH, which may be received from the UE directly or relayed from the relay node. The basis may be a longer term decision criteria such as M NACKs received within a time duration T, and a shorter term criteria (each individual ACK/NACK) may be used to switch among mode pairs A' and B' and to switch among mode pairs B' and C' while the longer term criteria is used to switch between mode pairs.

In another aspect is a method, a memory storing a program and an apparatus that is configured to transmit to a user equipment, in a first subframe of a radio frame, a downlink shared channel (with or without the DRS) according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, the downlink shared channel according to the second relay-transmission mode, but in this embodiment the channel quality on which the switching between first and second (and third, mode B) relay-transmission modes is based comprises the UE's CQI reports, which like the ACK/NACK implementation above may be received directly from the UE or received from the relay node which relays the CQI reports to the eNB. It is noted that in mode A the CQI reports will be based on the CRS sent with the PDSCH whereas in mode C the CQI reports will be based on the DRS sent with the PDSCH. Switching from mode A to mode B or C may be based on the reported CQI value remaining below a threshold CQI value for a time duration t1, and switching back may be based on the may be based on the reported CQI value exceeding a threshold CQI value for a time duration (the thresholds and time durations may be identical but may also differ from one another).

In another aspect is a method, a memory storing a program and an apparatus that is configured to transmit to a user equipment, in a first subframe of a radio frame, a common reference signal on a downlink shared channel (with or without the DRS) according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, a dedicated reference signal in the downlink shared channel according to the second relay-transmission mode, but unlike certain variations above in this case beamformed transmission of the DRS is not needed. The UE's reported CQI is wideband and the same DRS is used for all UEs in the cell. For the case that the UE's CQI report is based on the CRS (e.g., mode A), the UE's CQI report will also be wideband so long as the relay gain in mode B is compensated, such as by an OLLA mechanism.

In another aspect a combination of the UE's ACK/NACK reports and the UE's CQI reports are used as the channel quality on which the switching between relay-transmission modes is based.

In an embodiment is a method, a memory storing a program and an apparatus that is configured to transmit to a user equipment in a first subframe of a radio frame a downlink shared channel according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, the downlink shared channel according to the second relay-transmission mode. In this embodiment the HARQ process is synchronous and non-adaptive for mode C, in which the eNB re-transmits packets to the UE in a predetermined fashion so as to be concurrent with transmission of those same packets from the relay, as scheduled by the eNB. In this embodiment the eNB receives the UE's NACK for the data that is to be re-transmitted via relay through the relay node.

In another embodiment, is a method, a memory storing a program and an apparatus that is configured to transmit to a user equipment in a first subframe of a radio frame a downlink shared channel according to a first relay-transmission mode (e.g., mode A or A'), to switch to a second relay-transmission mode (e.g., mode C or C') within the radio frame based on a channel quality of the downlink shared channel, and after switching, to transmit to the user equipment, in a subsequent subframe of the same radio frame, the downlink shared channel according to the second relay-transmission mode. In this embodiment the HARQ process is asynchronous and adaptive for mode C, and the eNB receives the UE's NACK directly from the UE. The eNB indicates to the relay node that there is to be a packet re-transmission and radio resources (e.g., subframe) on which it is to occur such as on the PDCCH, and the eNB and the relay node concurrently transmit the NACK'd packet to the UE. Or in another variation the UE's NACK is relayed to the eNB from the relay node which receives it on the PUCCH. Or in another variation the UE's NACK is relayed to the eNB from the relay node which receives it on the PUSCH if the UE is transmitting on the UL. In all instances of these HARQ variations the eNB schedules the PUCCH or PUSCH on which the UE sends its ACK/NACK to the packets that the eNB and/or relay node sent in the PDSCH, which of course the eNB schedules the PDSCH in the first place. The CRS/DRS distinction may or may not be present in embodiments according to this aspect of the invention.

In another aspect, in mode A' the eNB sends the same data to the UE and to the relay node but the relay node only sends it to the UE if there is a NACK from the UE; and in mode C' the eNB and the relay node send the same data to the UE and the eNB additionally sends to the relay node further data for the UE, which the relay node stores for later transmission to the UE if a NACK is received from the UE. There is also a third mode B' in which the eNB and the relay node both transmit the same data to the UE, but this mode is reserved for the instances above where the UE's NACK is received and the data sent represents a retransmission of data sent earlier by the eNB to the UE.

For the aspects of this invention related to eNB 12, embodiments of this invention may be implemented by computer software executable by a data processor of the eNB 12, such as the processor 12A shown, or by hardware, or by a combination of software and hardware.

For the aspects of this invention related to the relay node 16, embodiments of this invention may be implemented by computer software executable by a data processor of the relay node 16, such as the processor shown for it at FIG. 1B, or by hardware, or by a combination of software and hardware.

Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention are illustrated and described as block diagrams, flow charts, or using some other pictorial representation such as the signaling of FIG. 2 and the flow diagram of FIG. 3, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
   transmitting to a user equipment in a first subframe of a radio frame on at least one downlink shared channel according to a first relay-transmission mode;
   switching to a second relay-transmission mode within the radio frame based on a channel quality of the downlink shared channel;
   after switching, transmitting to the user equipment in a subsequent subframe of the radio frame on the at least one downlink shared channel according to the second relay-transmission mode; and
   for the case of a packet re-transmission according to the second relay-transmission mode, re-transmitting the packet to the user equipment in a pre-determined manner so as to be concurrent with transmission of a same packet from a relay node; wherein
   transmitting in the first subframe comprises transmitting a common reference signal on the at least one downlink shared channel with no dedicated reference signal according to the first relay-transmission mode; and
   transmitting in the subsequent subframe comprises transmitting a dedicated reference signal on the at least one downlink shared channel according to the second relay-transmission mode.

2. The method according to claim 1, wherein the case of the packet re-transmission is determined by receiving directly from the relay node a negative acknowledgement which originated from the user equipment.

3. The method according to claim 1, executed by a wireless network access node which grants radio resources to the relay node, the method further comprising the access node re-transmitting the packet in the pre-determined manner.

4. The method according to claim 1, wherein non-adaptive synchronous hybrid automatic repeat request processes are used for each case of a packet re-transmission according to the second relay-transmission mode.

5. The method according to claim 1, wherein the channel quality is determined from at least one of:
   a channel quality indicator received from the user equipment which is based on a common reference signal transmitted in the first subframe according to the first relay-transmission mode; and
   a pre-determined plurality of acknowledgements and negative acknowledgements received from the user equipment within a prescribed time period.

6. The method according to claim 1, wherein:
   Transmitting, in the first subframe a common reference signal, is by a wireless network access node but not also by the relay node and is on at least one downlink control channel and on the at least one downlink shared channel;
   Transmitting, in the subsequent subframe a dedicated reference signal, is by the wireless network access node but not also by the relay node and is on at least one downlink control channel and on the at least one downlink shared channel; and
   the transmitting in the subsequent subframe is by the relay node under control of the access node and is on the at least one downlink shared channel.

7. The method according to claim 1, further comprising:
   switching to a third relay-transmission mode within the radio frame;
   transmitting, by the access node to the user equipment in a further subframe of the radio frame and according to the third relay-transmission mode, a common reference signal on the at least one downlink control channel without transmitting in the further subframe any dedicated reference signal and without transmitting in the further subframe on the downlink shared channel; and
   transmitting, by the relay node to the user equipment in the further subframe of the radio frame, a dedicated reference signal on the at least one downlink shared channel.

8. A computer program product comprising a non-transitory computer-readable medium bearing computer program code embodied therein for use with a computer, the computer program code comprising:
   code for transmitting to a user equipment in a first subframe of a radio frame on at least one downlink shared channel according to a first relay-transmission mode;
   code for switching to a second relay-transmission mode within the radio frame based on a channel quality of the downlink shared channel;
   code for after switching, transmitting to the user equipment in a subsequent subframe of the radio frame on the at least one downlink shared channel according to the second relay-transmission mode; and
   code for the case of a packet re-transmission according to the second relay-transmission mode, re-transmitting the packet to the user equipment in a pre-determined manner so as to be concurrent with transmission of a same packet from a relay node; wherein transmitting in the first subframe comprises transmitting a common reference signal on the at least one downlink shared channel with no dedicated reference signal according to the first relay-transmission mode; and transmitting in the subsequent subframe comprises transmitting a dedicated reference signal on the at least one downlink shared channel according to the second relay-transmission mode.

9. The computer program product according to claim 8, in which the case of the packet re-transmission is determined by receiving directly from the relay node a negative acknowledgement which originated from the user equipment.

10. An apparatus comprising:
at least one processor; and
at least one memory including computer program code the at least one memory and the computer program code configured to, with the at least one processor, cause the apparatus to perform at least the following:
transmit to a user equipment in a first subframe of a radio frame on at least one downlink shared channel according to a first relay-transmission mode;
switch to a second relay-transmission mode within the radio frame based on a channel quality of the downlink shared channel;
after switching, transmit to the user equipment in a subsequent subframe of the radio frame on the at least one downlink shared channel according to the second relay-transmission mode; and for the case of a packet re-transmission according to the second relay-transmission mode, re-transmit the packet to the user equipment in a pre-determined manner so as to be concurrent with transmission of a same packet from a relay node; wherein the apparatus is caused to perform:
transmit in the first subframe a common reference signal on the at least one downlink shared channel with no dedicated reference signal according to the first relay-transmission mode; and
transmit in the subsequent subframe a dedicated reference signal on the at least one downlink shared channel according to the second relay-transmission mode.

11. The apparatus according to claim 10, wherein the apparatus is caused to determine the case of the packet re-transmission by receiving directly from the relay node a negative acknowledgement which originated from the user equipment.

12. The apparatus according to claim 10, wherein the apparatus comprises a wireless network access node which grants radio resources to the relay node, and re-transmits the packet in the pre-determined manner.

13. The apparatus according to claim 10, wherein non-adaptive synchronous hybrid automatic repeat request processes are used for each case of a packet re-transmission according to the second relay-transmission mode.

14. The apparatus according to claim 10, wherein the apparatus is caused to further perform: determine the channel quality from at least one of:
a channel quality indicator, received from the user equipment, which is based on a common reference signal transmitted in the first subframe according to the first relay-transmission mode; and
a pre-determined plurality of acknowledgements and negative acknowledgements received from the user equipment within a prescribed time period.

15. The apparatus according to claim 10, wherein the apparatus comprises a wireless network access node which is caused to perform:
transmit in the first subframe a common reference signal on at least one downlink control channel and on the at least one downlink shared channel but the common reference signal is not also transmitted by the relay node;
transmit in the subsequent subframe a dedicated reference signal on at least one downlink control channel and on the at least one downlink shared channel but the dedicated reference signal is not also transmitted by the relay node; and
control the relay node to transmit in the subsequent subframe on the at least one downlink shared channel.

16. The apparatus according to claim 10, wherein the apparatus is caused to further perform:
switch to a third relay-transmission mode within the radio frame;
transmit, to the user equipment in a further subframe of the radio frame and according to the third relay-transmission mode, a common reference signal on the at least one downlink control channel without transmitting in the further subframe any dedicated reference signal and without transmitting in the further subframe on the downlink shared channel; and
control the relay node to transmit, to the user equipment in the further subframe of the radio frame, a dedicated reference signal on the at least one downlink shared channel.

* * * * *